April 21, 1936.  P. P. ALEXANDER  2,038,402
METHOD FOR REDUCTION OF REFRACTORY OXIDES
Filed April 11, 1933
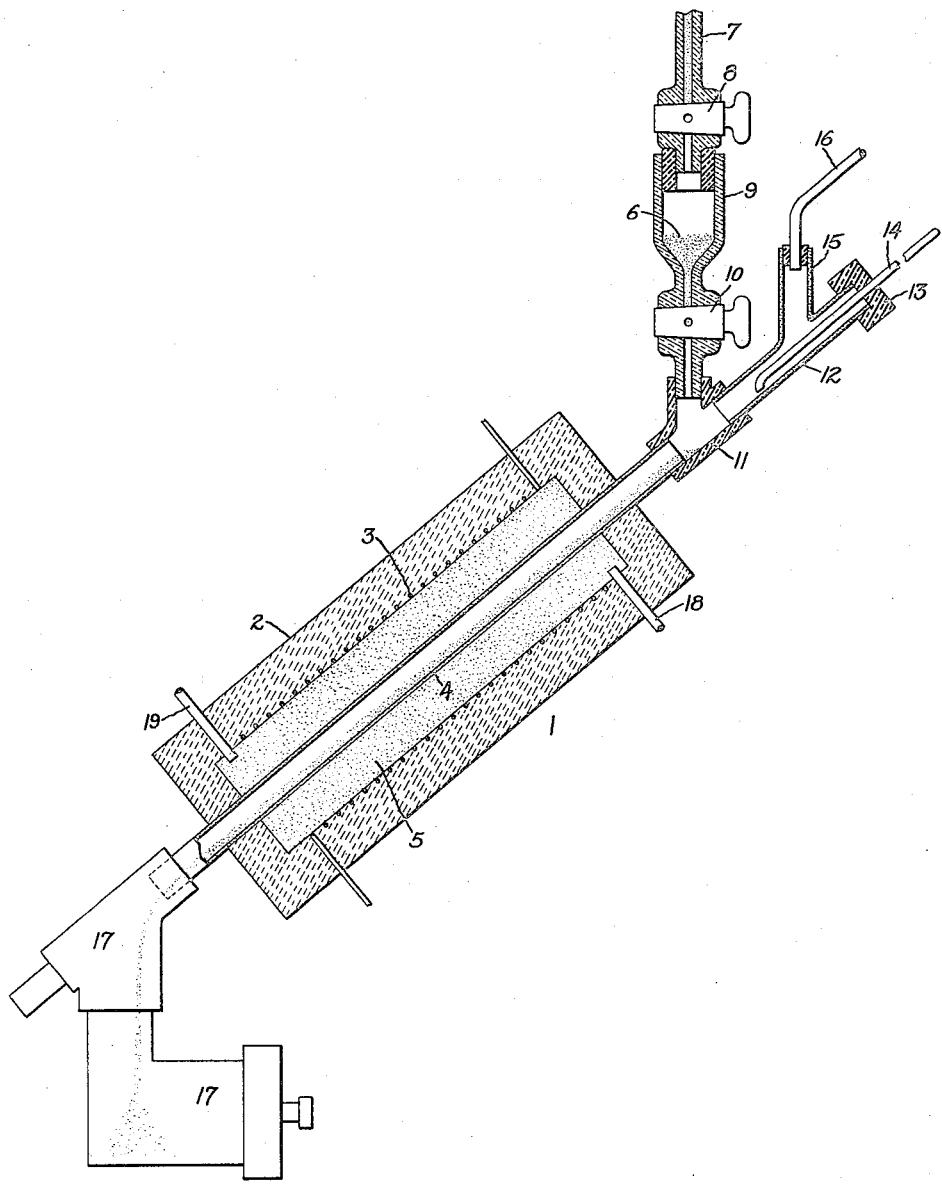
Inventor:
Peter P. Alexander,
by Charles E. Mueller
His Attorney.

Patented Apr. 21, 1936

2,038,402

UNITED STATES PATENT OFFICE 2,038,402

METHOD FOR REDUCTION OF REFRACTORY OXIDES

Peter P. Alexander, Marblehead, Mass., assignor to General Electric Company, a corporation of New York Application April 11, 1933, Serial No. 665,571

11 Claims. (Cl. 75—84)

The present invention relates to a method for reducing refractory oxides and more particularly to a method for reducing chromium oxide $Cr_2O_3$. Certain refractory oxides cannot be reduced readily by molecular hydrogen even at high temperatures. To accomplish such a result, it has been necessary heretofore to purify and dry the hydrogen in an extremely elaborate manner. Even under such conditions the speed of reduction is very slow. For this reason, although the reduction of refractory oxides, such as chromium oxide, has been an accomplished fact for many years, the processes heretofore employed have never acquired industrial importance.

It is well known that many metals will occlude large volumes of hydrogen at relatively high temperatures and normal atmospheric pressures and will evolve such occluded gases in a vacuum when heated to higher temperatures. When hydrogen gas is evolved from such metals it is in a very pure and active condition and if permitted to come into contact with an oxide will reduce it readily. The speed of reduction may be controlled by regulating the vacuum pressure and temperature. I employ these principles in carrying out the present invention.

It is one of the objects of the present invention to provide a simple and relatively inexpensive process for the reduction of refractory oxides. It is a further object to provide a process for quickly and efficiently reducing refractory oxides. Other objects will appear hereinafter.

The novel features which are characteristic of the present invention are set forth with particularity in the appended claims. The invention itself however will best be understood from reference to the following specification when considered in connection with the accompanying drawing in which the single figure shows diagrammatically a view partly in section and partly in elevation of an apparatus whereby my invention may be carried into effect.

Referring more particularly to the drawing, I have represented at 1 an electric furnace which is mounted so as to be inclined at an angle with the horizontal. The furnace comprises a hollow refractory tubular member 2 provided with a heating coil 3 connected to a suitable source of electric energy not shown. A tubular refractory member 4 which is porous and made of aluminum oxide, commonly known as alundum, extends through the member 2 and slightly beyond the upper and lower ends thereof. Those portions of the tube 4 which extend beyond the member 2 are glazed to prevent admission of air to the tube. The space within member 2 and around the outside of tube 4 may be filled with a suitable material 5 which may be a metal hydride such as calcium hydride or any metal capable of occluding a large volume of hydrogen. The hydride or metal preferably should be in finely divided form.

At the upper end of the tube 4 means are provided for supplying a required or measured quantity of a refractory oxide 6 to the tube 4. These means comprise a pipe 7 connected to a source of oxide supply. The lower end of pipe 7 is provided with a stop cock 8 which may admit a measured quantity of refractory oxide into a receptacle 9. The receptacle 9 is provided with a stop cock 10 for admitting the refractory oxide to tube 4, and is connected to tube 4 by means of a T 11 carrying at its outer end a suitable tube 12 which extends in the same axial direction as tube 4 and is in effect a continuation thereof. Tube 12 is provided at its upper end with a closure member 13 through which a rod 14, made of tungsten or other suitable material, is mounted for reciprocating movement within tube 4. Rod 14 is employed to clean tube 4 and to push the refractory oxide through the tube. The tube 12 is also provided with an extension 15 which carries a pipe 16 connected to a vacuum pump not shown. The lower end of the tube member 4 is closed by a receptacle 17 into which the pure metal reduced within tube 4 may be collected.

In operation, the stop cock 10 is closed and receptacle 9 filled with a desired quantity of a refractory oxide to be reduced. The member 2 is filled with a finely divided hydride or a metal 5 capable of occluding a large quantity of hydrogen, preferably calcium. If a metal such as calcium is employed it is heated to a dull red heat by means of the heating coil 3 while hydrogen is supplied to the finely divided metal through an inlet pipe 18. The hydrogen flows out of receptacle 2 through an outlet pipe 19. At a dull red heat the calcium absorbs a very large volume of hydrogen forming calcium hydride $CaH_2$. This reaction is exothermic and therefore does not consume any energy. At this point the hydrogen supply is shut off and the temperature of the hydride increased. At about 675° C. evolution of hydrogen from the hydride will commence in an attenuated atmosphere or vacuum. The temperature of the furnace is now increased to about 1,000° C. or higher while a vacuum of about 100 microns is established therein. Stop cock 8 is now closed and stop cock 10 opened to admit a desired quantity of refractory oxide to tube 4. The oxide gradually moves downwardly in tube 4 due to its inclination, and is subjected to the action of the evolved or nascent hydrogen.

The hydrogen comes out of the hydride at tremendous speed and is in a very pure and active condition. It penetrates through the porous tube 4 and quickly effects the reduction of the refractory oxide leaving reduced metal which gradually moves into the receptacle 17. The complete reduction of a refractory oxide such as chromium oxide $Cr_2O_3$ may be completed in about six minutes although this time will vary depending upon the degree of vacuum and temperature employed. The more perfect the vacuum and the higher the temperature employed to cause liberation of the hydrogen the shorter the process will be.

Although I generally employ a rough vacuum or attenuated atmosphere of about 100 microns a much poorer vacuum may be employed if desired, for example a vacuum of about 30,000 microns. With the latter vacuum the reduction process may still be accomplished quickly but at a slower rate than when a higher vacuum is employed.

The reaction which takes place within the furnace 1 in the reduction of $Cr_2O_3$ is as follows:—

$$Cr_2O_3 + 3CaH_2 = 2Cr + 3Ca + 3H_2O$$

The water vapor produced by the reduction of the oxide is rapidly removed by the vacuum pump and does not interfere with the evolution of hydrogen from the hydride. The refractory oxide may be supplied continuously to tube 4 until substantially all the hydrogen has been removed from the hydride. The calcium in receptacle 2 then may be cooled again to a dull red heat and supplied with hydrogen to again form the hydride. The same calcium therefore may be used over and over again.

I have found that the metal calcium is particularly desirable for use in my process since it will absorb about 850 volumes of hydrogen at dull red heat and will readily evolve the hydrogen at temperatures above 675° C. in a vacuum. My invention however is not limited to the use of calcium or any other specific metal. Many metals including palladium, tantalum, chromium and cobalt as well as others have the property of absorbing hydrogen at red heat and evolving it at higher temperatures in a vacuum. Tantalum for example, absorbs about 740 volumes of hydrogen at about red heat and readily evolves the hydrogen when heated to about 950° C. in a vacuum.

While I usually employ a tube 4 made of alundum, I may employ a tube made of nickel when the powdered material 5 consists of calcium or calcium hydride. In the event that a nickel tube is employed it is provided with numerous small perforations on the upper portion thereof so as to permit the liberated hydrogen to enter the tube.

It will be obvious that the apparatus and method disclosed in the single figure of the drawing may be modified without departing from the spirit of the present invention. For example, instead of employing powdered calcium and a porous alundum tube 4, as shown on the present drawing, the calcium or powdered material 5 may be omitted and the tube 4 made of palladium or other suitable metal capable of absorbing hydrogen. The palladium tube when heated to a dull red heat absorbs hydrogen and when heated to a higher temperature in a vacuum or attenuated atmosphere evolves hydrogen which is in a nascent condition and will completely and quickly reduce the refractory oxide within the tube. In this way the operation can be continuous, since the palladium tube will absorb hydrogen continuously on the outside of the tube which is subjected to hydrogen at normal pressure and will evolve it on the inside of the tube which is subjected to a vacuum.

Also, if desired, a refractory oxide to be reduced and a metal such as calcium, palladium or other suitable metal both preferably in finely divided form, may be introduced together into any suitable crucible or a receptacle such as tube 4 and then heated to a temperature at which the metal will absorb or occlude a large volume of hydrogen. The material in the tube may then be subjected to a vacuum or attenuated atmosphere while heated to a temperature high enough to cause liberation of the occluded hydrogen. The nascent hydrogen thus produced effects a complete reduction of the refractory oxide. The resulting mixture of pure metals, for example chromium and calcium may be readily separated by gravity or by any of the well known methods. It will be clear that instead of mixing the refractory oxide with a metal such as calcium and then supplying hydrogen to the mixture while the calcium is heated to a dull red heat, the refractory oxide may be mixed with calcium hydride and the mixture heated in a vacuum at a temperature high enough to liberate the hydrogen.

The reaction which takes place between the mixed oxide and hydride as heretofore indicated is as follows:

$$Cr_2O_3 + 3CaH_2 = 2Cr + 3Ca + 3H_2O$$

The water vapor may be quickly removed by the vacuum pump. If it is not quickly removed it reacts with the calcium as follows:

$$2Cr + 3Ca + 3H_2O = 2Cr + 3CaO + 3H_2$$

In either case however the result is substantially the same since the water vapor produced during the reaction is quickly removed either by evacuation or reduction and therefore does not affect the reduced metal.

What I claim as new and desire to secure by Letters Patent of the United States, is:

1. The method of reducing a refractory oxide which comprises heating the oxide and a metal containing hyrogen in close association in a vacuum and at a temperature high enough to liberate the hydrogen.

2. The method of reducing an oxide of a metal which comprises placing the oxide and calcium hydride in a container, reducing the pressure within said container and heating the hydride to a temperature high enough to liberate the hydrogen therefrom.

3. The method of reducing chromium oxide which comprises heating said oxide and a metal containing hydrogen in close association and at a temperature high enough to evolve said hydrogen, and quickly removing any water vapor formed during the reduction of said oxide.

4. The method of reducing chromium oxide which comprises placing the oxide and calcium hydride in a receptacle creating a vacuum therein and heating said hydride to a temperature high enough to evolve hydrogen from said hydride.

5. The method of reducing a refractory oxide which comprises heating said oxide and a metal containing hydrogen in close association in a vacuum and at a temperature high enough to liberate the hydrogen and causing said oxide to move through the hydrogen as it is liberated from said metal.

6. The method of reducing an oxide of a metal which comprises placing a mixture of said oxide and a hydride in a container and subjecting said mixture to a temperature and pressure at which hydrogen will be evolved from said hydride, and quickly removing any water vapor formed during the reduction of said oxide.

7. The method of reducing chromium oxide which comprises placing a mixture of chromium oxide and a hydride in a receptacle creating a vacuum therein and heating the mixture to a temperature high enough to evolve hydrogen from said hydride.

8. The method of preparing chromium which comprises placing a mixture of chromium oxide and a hydride in a receptacle and subjecting the mixture to a temperature and pressure at which hydrogen will be evolved from said hydride, and quickly removing any water vapor formed during the reduction of said oxide.

9. The method of reducing chromium oxide which comprises placing a mixture of said oxide and a hydride in a receptacle and subjecting the mixture to a temperature and pressure at which hydrogen will be evolved from said hydride, and quickly removing any water vapor formed during the reduction of said oxide.

10. The method of reducing an oxide of a metal which comprises placing said oxide and a hydride in a container, subjecting the material within said container to a temperature and pressure at which hydrogen is evolved from the hydride, and evacuating any moisture produced by the reduction of said oxide.

11. The method of reducing an oxide of a metal which comprises placing said oxide and calcium hydride in a container, subjecting the material within said container to a temperature and pressure at which hydrogen is evolved from the hydride, and evacuating any moisture produced by the reduction of said oxide.

PETER P. ALEXANDER.